Oct. 17, 1933.   T. SAKO   1,931,359
SIGNAL DEVICE FOR VEHICLES
Filed May 5, 1932   3 Sheets-Sheet 1

Toshio Sako
INVENTOR

BY Victor J. Evans & Co.
ATTORNEY

Oct. 17, 1933.   T. SAKO   1,931,359
SIGNAL DEVICE FOR VEHICLES
Filed May 5, 1932   3 Sheets-Sheet 2

Toshio Sako
INVENTOR
BY Victor J. Evans & Co.
ATTORNEY

Oct. 17, 1933. T. SAKO 1,931,359
SIGNAL DEVICE FOR VEHICLES
Filed May 5, 1932 3 Sheets-Sheet 3
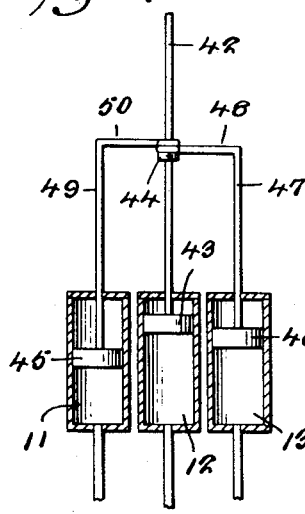
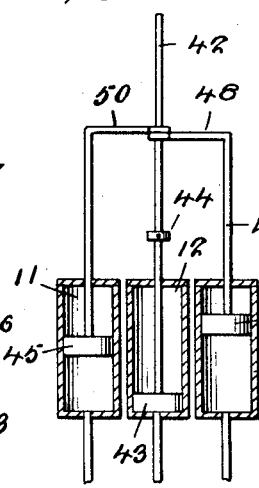
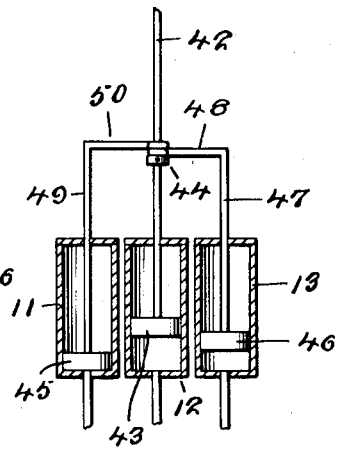
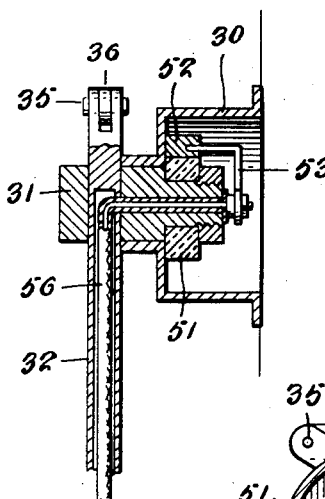
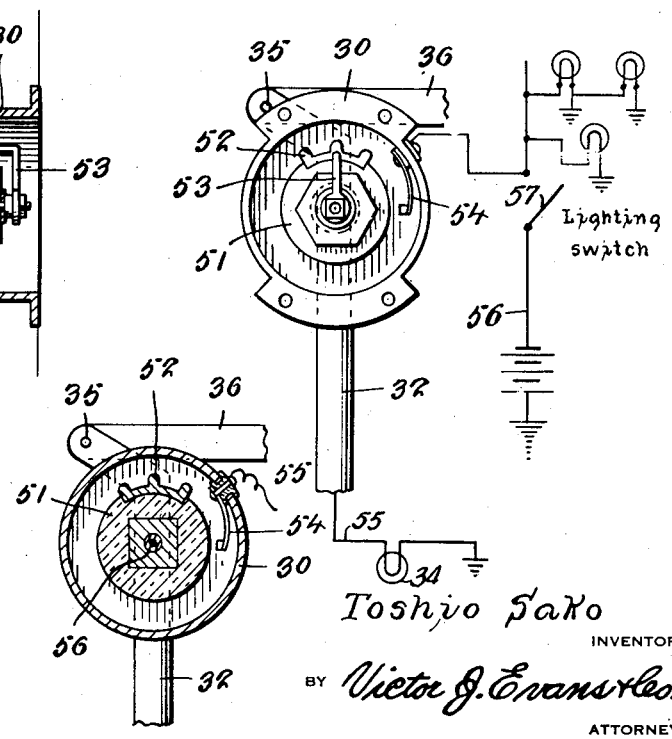
Toshjo Sako
INVENTOR
BY Victor J. Evans & Co.
ATTORNEY Patented Oct. 17, 1933

1,931,359

UNITED STATES PATENT OFFICE 1,931,359

SIGNAL DEVICE FOR VEHICLES

Toshio Sako, Sebastopol, Calif.

Application May 5, 1932. Serial No. 609,475

5 Claims. (Cl. 116—39)

The invention relates to signal devices for vehicles and more particularly to automobile signal apparatus.

The primary object of the invention is the provision of an apparatus of this character wherein on installation in an automobile, an operator thereof will have control of a series of signals, these conforming to the direction of travel of the vehicle, so that oncoming and following traffic will have full knowledge of the selected direction of movement of the vehicle, the apparatus being novel in form and its power means is obtained from the suction of the motor of the vehicle.

Another object of the invention is the provision of an apparatus of this character, wherein the signal medium can be illuminated and the illumination is automatically controlled, so that there is no possibility of the waste of electric energy and also such signal medium will be clearly visible both by day and night.

A further object of the invention is the provision of an apparatus of this character, wherein the operator can conveniently actuate the controls for the signal, they being located at an accessible locality forwardly of the seat of the driver of the vehicle.

A still further object of the invention is the provision of an apparatus of this character which is comparatively simple in construction, readily and easily mountable in an automobile without necessity of alteration in the standard equipment thereof, thoroughly reliable and efficient in its operation, durable, and inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:—

Figure 4 is a vertical sectional view through the suction cylinders with the pistons therein in original or normal position.

Figure 5 is a view similar to Figure 4 showing the pistons in position for a right hand signal.

Figure 6 is a view similar to Figure 5 showing the position of the pistons for the left hand signal.

Figure 7 is an enlarged sectional view on the line 7—7 of Figure 3.

Figure 8 is a detail elevation of the switch in the light circuit.

Figure 9 is a sectional view through Figure 8.

Similar reference characters indicate corresponding parts throughout the several views in the drawings.

Figure 1:
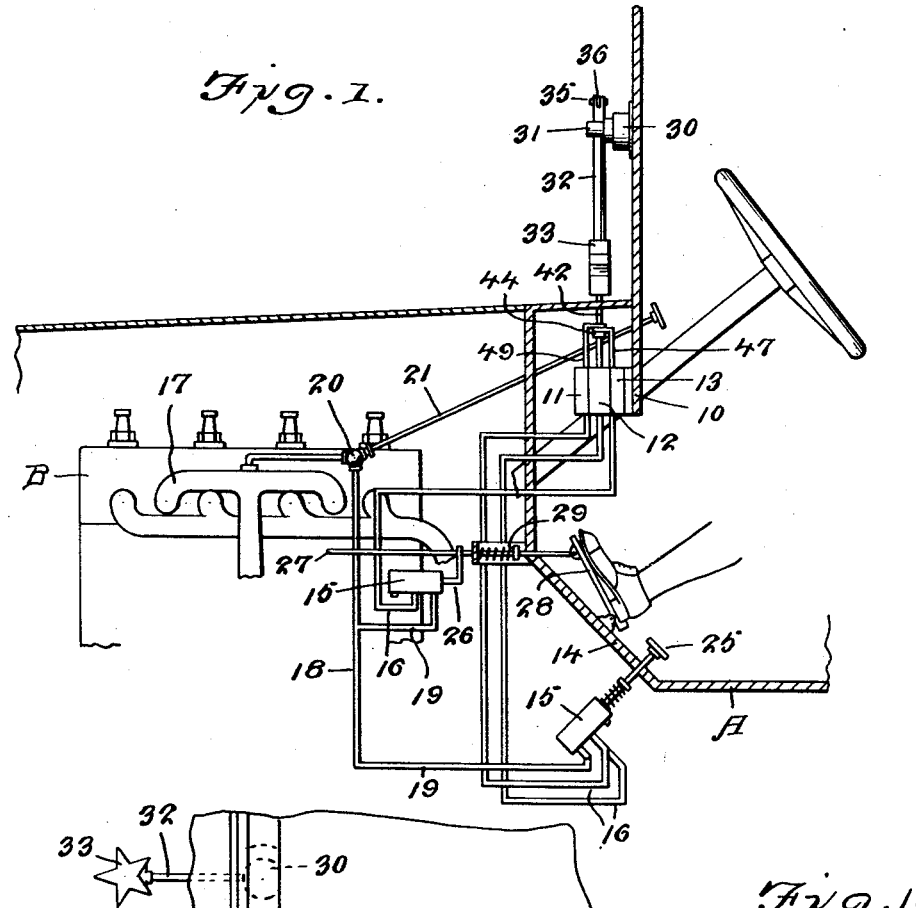
Figure 1 is a fragmentary vertical longitudinal sectional view through an automobile showing the apparatus mounted therein in accordance with the invention.
Figure 10:
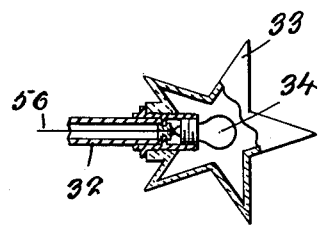
Figure 10 is a fragmentary view of the signal medium, the same being partly broken away.
Figure 2:
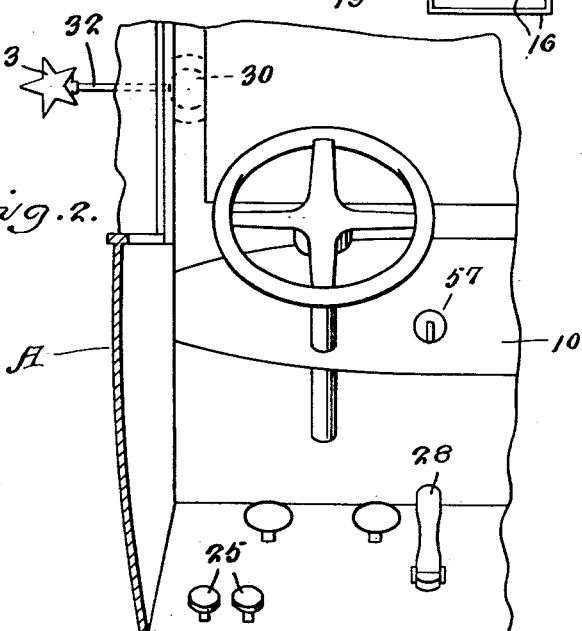
Figure 2 is a fragmentary vertical transverse sectional view showing in detail the position or location of the controls for the apparatus.

Referring to the drawings in detail, A designates generally a portion of the body of an automobile, B a portion of its motor or engine, the body A being provided as usual with the instrument board 10 and upon this board is supported a series of cylinders 11, 12 and 13 respectively which are mounted thereon stationarily in any suitable manner, while arranged at a suitable locality beneath the floor board 14 of the body A are the slide valve chests 15, one for each cylinder. These cylinders 11, 12 and 13 have the leads or pipes 16 opening into the chests 15 while leading from the inlet manifold 17 of the engine or motor B is a lead or pipe 18 having the branches 19 opening into the chests 15 spaced from the leads 16. The pipe 18 is provided with a valve shell 20, its valve operable from a stem 21 extended within the body A of the automobile in convenient reach of the driver or operator and this stem 21 will open and close said valve 20 at the will of said driver or operator.

Figure 3:
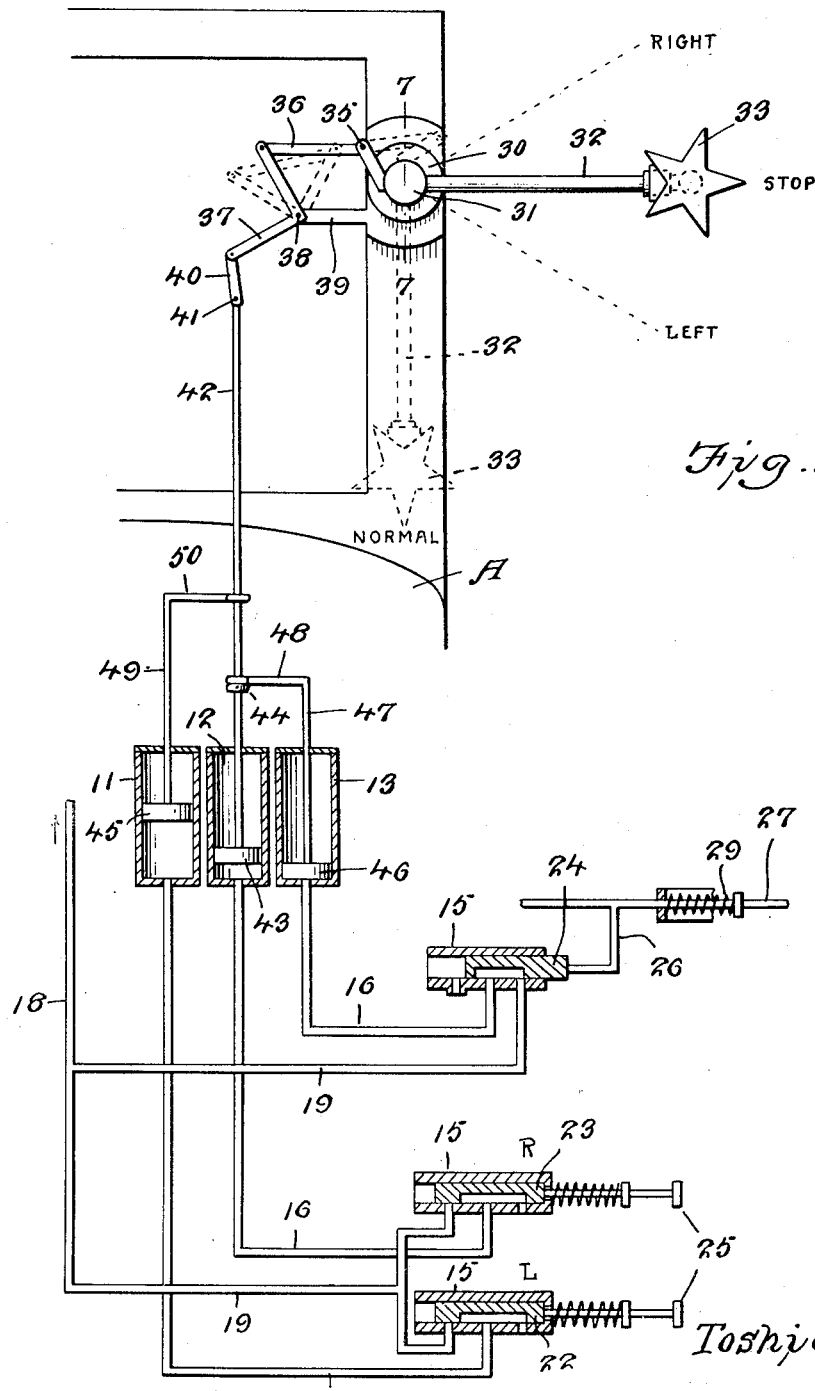
Figure 3 is a front elevation of the signal apparatus showing diagrammatically and in section the mechanism for the control thereof.

Arranged within the chests 15 are the slide valves 22, 23 and 24 respectively, the valve 22 controlling the lead to the cylinder 11, the valve 23 controlling the lead to the cylinder 12, and the valve 24 controlling the lead to the cylinder 13 as will be obvious from Figure 3 of the drawings. The valves when shifted in the chests 15 will establish communication between the leads 16 and 18 so that when the valve 20 is open suction will take place within the cylinder. The valves 22 and 23 have spring tensioned actuator pedals 25, these extended through the floor board 14 for convenient manipulation by the foot of the driver or operator. The valve 24 has the connection 26 with the accelerator rod 27 operated from the accelerator pedal 28 upon the floor board 14 within the body A of the vehicle. This accelerator rod 27 is under tension by the spring 29 as usual.

Mounted upon the windshield frame or the front corner post of the body A of the vehicle exteriorly of the latter is a housing 30 in which is centrally journaled a rotatable stud 31 carrying a swinging signal arm 32, the outer free end of which is provided with a substantially five pointed star hollow head 33 and within this head is an electric bulb 34, while the arm 32 at the other end 35 thereof has pivoted thereto a link 36 connected to a bell crank 37 pivoted at 38 upon a hanger 39 fixed to the body of the vehicle, the bell crank 37 being also pivoted to a link 40 which is connected by the pivot 41 to a piston stem or rod 42 having the piston 43 within the cylinder 12. The piston stem or rod 42 carries an abutment 44 while working within the cylinders 11 and 13 are pistons 45 and 46 respectively, the latter having its stem 47 provided with a right-angular extension 48 loosely engaged upon the stem or rod 42 above the shoulder 44 and likewise the piston 45 has its stem 49 provided with a right-angular extension 50 loosely connected with the stem or rod 42 above the connection of the extension 48 therewith. The stems or rods 47 and 49 are of different lengths with respect to each other and greater than the distance between the piston 43 and abutment 44 so that on downward movement of piston 46 it will be moved in its cylinder 13 the required distance to swing the arm 22 to "stop" signalling position, while on downward movement of piston 43 the arm will be moved to right hand signalling position and on the downward movement of piston 35 the said arm 32 will be moved to left hand signalling position.

On the rotatable stud 31 and within the housing 30 is an insulating hub 51 having peripherally arranged thereon a multiple rack-like switch contact 52 with the connector 53 engaged with the end of wire 55, while within the housing and carried thereby is a switch wiper contact 54 to engage with the contact 52 and complete a circuit through the wires 55 and 56 of a lighting circuit when its lighting switch 57 is closed so that the bulb 34 will be illuminated. The rack formation of the contact 52 gives an intermittent illumination to the bulb when the contact 54 is operating therewith and thus it will be seen that when the arm 32 is swung from normal lowered position with the light bulb out to raised selected positions for signaling a stop, right hand turn or left hand turn at these signaling points of positions of the arm will be lighted provided the switch 57 of the lighting circuit is closed which is the case during night driving. The switch 57 is manually controlled by the driver or operator of the automobile.

It should be clearly obvious that under the vacuum or suction of the motor B within the automobile the pistons 43, 45 and 46 will be selectively moved within their respective cylinders to operate the arm 32 for the positioning thereof to give a determined signal corresponding to the direction of travel of the automobile. The suction from the engine B is regulated or controlled by the pedals 25 and 28 operative by the foot of the driver or operator of the automobile. When the accelerator pedal 28 is depressed this moves the valve 24 to bleeding position so that the arm 32 will remain lowered in non-signalling position while the valves 22 and 23 are in closing position shutting off communication of the cylinders 11 and 12 with the intake manifold of the engine and the weight of the arm 32 will hold the pistons in all cylinders uppermost therein until the valves have been shifted, whereupon the arm 32 will be selectively moved for "stop" signalling or for right and left hand turn signalling. The complete operation of the apparatus should be clearly apparent when taken in connection with the accompanying drawings and the foregoing description so that a further delineation is deemed unnecessary and is omitted for brevity.

What is claimed is:—

1. In an apparatus of the character described, a swinging signal arm, a plurality of cylinders stationarily mounted, leads to said cylinders from an intake manifold of an internal combustion engine, foot operated valves normally shutting off the leads to said cylinders and adapted when actuated to open said leads selectively, pistons working in said cylinders, a stem to one of the pistons and connected with the swinging signal arm, stems to the other pistons and having loose connections with the first named stem, and an abutment on the first named stem and positioned to be engaged by the connections of the said other stems therewith whereby on shifting of the pistons of either of the last named stems the first named stem will be operated for positioning the signal arm at selected signalling positions.

2. In an apparatus of the character described, a swinging signal arm, a plurality of cylinders stationarily mounted, valve chests having leads to said cylinders, valves working in said chests, suction pipes communicating with a motor and leading to the chests, pistons working within the cylinders, a connection between the signal arm and one piston for moving said signal arm to a selected signalling position, a shoulder on said connection, connections between the remaining pistons and said first named connection for movement of the latter by selective action of either of the said other pistons to shift the signal arm to another signalling position, and foot operated members for controlling said valves.

3. In an apparatus of the character described, a swinging signal arm, a plurality of cylinders stationarily mounted, valve chests having leads to said cylinders, valves working in said chests, suction pipes communicating with a motor and leading to the chests, pistons working within the cylinders, a connection between the signal arm and one piston for moving said signal arm to a selected signalling position, a shoulder on said connection, connections between the remaining pistons and said first named connection for movement of the latter by selective action of either of the said other pistons to shift the signal arm to another signalling position, foot operated members for controlling said valves, and an illuminating device on the free end of said arm.

4. In an apparatus of the character described, a swinging signal arm, a plurality of cylinders stationarily mounted, valve chests having leads to said cylinders, valves working in said chests, suction pipes communicating with a motor and leading to the chests, pistons working within the cylinders, a connection between the signal arm and one piston for moving said signal arm to a selected signalling position, a shoulder on said connection, connections between the remaining pistons and said first named connection for movement of the latter by selective action of either of the said other pistons to shift the signal arm to another signalling position, foot operated members for controlling said valves, an illuminating device on the free end of said arm, and means for intermittently controlling the lighting of the illuminating device.

5. In an apparatus of the character described, a swinging signal arm, a plurality of cylinders stationarily mounted, valve chests having leads to said cylinders, valves working in said chests, suction pipes communicating with a motor and leading to the chests, pistons working within the cylinders, a connection between the signal arm and one piston for moving said signal arm to a selected signalling position, a shoulder on said connection, connections between the remaining pistons and said first named connection for movement of the latter by selective action of either of the said other pistons to shift the signal arm to another signalling position, foot operated members for controlling said valves, an illuminating device on the free end of said arm, means for intermittently controlling the lighting of the illuminating device, and a manually operated cut-off valve between the motor and said pipes.

TOSHIO SAKO.